US012212670B2

(12) United States Patent
Chung et al.

(10) Patent No.: US 12,212,670 B2
(45) Date of Patent: Jan. 28, 2025

(54) CIRCUIT, APPARATUS AND METHOD FOR CALCULATING MULTIPLICATIVE INVERSE

(71) Applicant: Electronics and Telecommunications Research Institute, Daejeon (KR)

(72) Inventors: Do-Young Chung, Daejeon (KR); Doo-Ho Choi, Cheonan-si Chungcheongnam-do (KR); Sok-Joon Lee, Daejeon (KR); Seung-Kwang Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 958 days.

(21) Appl. No.: 17/214,588

(22) Filed: Mar. 26, 2021

(65) Prior Publication Data
US 2021/0390443 A1   Dec. 16, 2021

(30) Foreign Application Priority Data

Jun. 10, 2020 (KR) .................. 10-2020-0070446

(51) Int. Cl.
*H04L 9/08* (2006.01)
*G06F 7/72* (2006.01)
(Continued)

(52) U.S. Cl.
CPC ............ *H04L 9/0858* (2013.01); *G06F 7/727* (2013.01); *H03K 19/20* (2013.01); *H04L 9/0631* (2013.01)

(58) Field of Classification Search
CPC ........ G06N 10/00; G06N 10/20; G06F 7/727; G06F 7/721; G06F 7/52; G06F 7/5525;
(Continued)

(56) References Cited

U.S. PATENT DOCUMENTS 7,421,076 B2   9/2008 Stein et al.
7,508,937 B2 * 3/2009 Stein .................... H04L 9/0631
380/37
(Continued)

FOREIGN PATENT DOCUMENTS

KR   100991713 B1   11/2010
KR   101740277 B1   6/2017

OTHER PUBLICATIONS

Amy et al.; "T-Count Optimization and Reed-Muller Codes", 2019, IEEE Transactions on Information Theory, vol. 65, No. 8, pp. 4771-4784. (Year: 2019).*
(Continued)

*Primary Examiner* — Matthew Smithers
(74) *Attorney, Agent, or Firm* — William Park & Associates Ltd.

(57) ABSTRACT

Disclosed herein are an apparatus and method for calculating a multiplicative inverse. The apparatus for calculating a multiplicative inverse includes a data input unit for receiving input data, a multiplicative inverse calculation unit for dividing an input degree-8 finite field corresponding to the input data into two first degree-4 finite fields so as to perform Advanced Encryption Standard (AES) encryption on the input data, and for performing a multiplicative inverse calculation on the first degree-4 finite fields in consideration of a circuit depth value (T-Depth) and qubit consumption of quantum gates in a quantum circuit, and a data output unit for outputting result data obtained by performing the multiplicative inverse calculation.

16 Claims, 8 Drawing Sheets

(51) Int. Cl.
*H03K 19/20* (2006.01)
*H04L 9/06* (2006.01)

(58) Field of Classification Search
CPC ............ G06F 2207/5521; H03K 19/20; H04L 9/0631; H04L 9/0852; H04L 2209/12
See application file for complete search history.

(56) References Cited

U.S. PATENT DOCUMENTS

| | | | |
|---|---|---|---|
| 7,512,647 | B2 | 3/2009 | Wilson et al. |
| 8,139,764 | B2 | 3/2012 | Chester et al. |
| 9,286,474 | B2 | 3/2016 | Lee et al. |
| 11,336,425 | B1* | 5/2022 | Lablans .............. H04J 13/0029 |
| 2003/0133568 | A1* | 7/2003 | Stein ..................... H04L 9/0631 380/37 |
| 2003/0219118 | A1* | 11/2003 | Beverly .................. G06F 7/726 380/28 |
| 2004/0184602 | A1* | 9/2004 | Nadehara .............. H04L 9/0631 380/28 |
| 2005/0169463 | A1* | 8/2005 | Ahn ...................... H04L 9/0631 380/28 |
| 2006/0002548 | A1* | 1/2006 | Chu ....................... H04L 9/0631 380/28 |
| 2006/0093136 | A1* | 5/2006 | Zhang ................... H04L 9/0631 380/29 |
| 2010/0250965 | A1* | 9/2010 | Olson ................ G06F 9/30007 380/28 |
| 2010/0322412 | A1* | 12/2010 | Hung ...................... G06F 7/726 708/492 |
| 2012/0076294 | A1 | 3/2012 | Koo et al. |
| 2016/0182227 | A1* | 6/2016 | Michiels ................... H04L 9/06 380/28 |
| 2016/0204938 | A1* | 7/2016 | Kounavis ................. G06F 7/00 380/30 |
| 2017/0293572 | A1* | 10/2017 | Satpathy .................. G09C 1/00 |
| 2019/0044699 | A1 | 2/2019 | Satpathy et al. |
| 2019/0372753 | A1* | 12/2019 | Dorrendorf .............. G09C 1/00 |
| 2020/0311592 | A1* | 10/2020 | Gidney ................... G06F 7/505 |
| 2021/0152329 | A1* | 5/2021 | Subbumurugesan ........................ H03M 13/091 |
| 2022/0278822 | A1* | 9/2022 | Ekdahl .................. H04L 9/0631 |

OTHER PUBLICATIONS

Zulehner et al.; "Accuracy and Compactness in Decision Diagrams for Quantum Computation", 2019, IEEE, pp. 280-283 (Year: 2019).*

Almazrooie et al.; "Quantum Grover Attack on the Simplified-AES", 2018, ACM, pp. 204-211. (Year: 2018).*

Abd-El-Barr et al.; "An Efficient Pipelined Multiplicative Inverse Architecture for the AES Cryptosystem", 2014, International Journal of Information and Electronics Engineering, vol. 4, No. 2, pp. 81-86 (Year: 2014).*

Thornton et al.; "Quantum Logic Implementation of Unary Arithmetic Operations", 2008, IEEE, pp. 202-207. (Year: 2008).*

Naziri et al.; "The Memory-less Method of Generating Multiplicative Inverse Values for S-box in AES Algorithm", 2008, IEEE, pp. 1-5. (Year: 2008).*

Amento et al.; "Efficient quantum circuits for binary elliptic curve arithmetic: reducing T-gate complexity", 2018, Cornell University, arXiv:1209.6348v1, pp. 1-14. (Year: 2018).*

Amento et. al;"Quantum binary field inversion: improved circuit depth via choice of basis representation", 2018, Cornell Univeristy, arXiv:1209.5491v1, pp. 1-17. (Year: 2018).*

Markus Grassl et al., Applying Grover's algorithm to AES: quantum resource estimates, PQCrypto 2016: Post-Quantum Cryptography. pp. 29-43.

Samuel Jaques et al., Implementing Grover oracles for quantum key search on AES and LowMC, IACR Cryptol. ePrint Arch. 2019, https://arxiv.org/abs/1910.01700.

Liu, Peng et al., "Stochastic Optimization of Quantum Programs" Computer Jun. 4, 2019, p. 58-67, The IEEE Computer Society, Washington DC, USA.

* cited by examiner

FIG. 15

CIRCUIT, APPARATUS AND METHOD FOR CALCULATING MULTIPLICATIVE INVERSE

CROSS REFERENCE TO RELATED APPLICATION

This application claims the benefit of Korean Patent Application No. 10-2020-0070446, filed Jun. 10, 2020, which is hereby incorporated by reference in its entirety into this application.

BACKGROUND OF THE INVENTION

1. Technical Field

The present invention relates generally to the calculation of a multiplicative inverse, and more particularly to multiplicative inverse calculation technology for a finite field operation in an Advanced Encryption Standard (AES) cryptography system.

2. Description of the Related Art

The term "time-space complexity" in a quantum computer environment refers to the circuit depth of a quantum circuit, which influences qubits, corresponding to memory, and a computation (operation) time in a classic computer environment.

The circuit depth is measured based on the number of gates through which qubits must sequentially pass during an operation process. During a process in which the current quantum computer environment is developed, the time required for a T-gate is dominant over other gates in a quantum circuit, and thus T-depth, obtained by measuring only the number of T gates, is chiefly used.

The fact that a cryptography system is implemented as an efficient quantum circuit means that the security of the corresponding cryptography system is weakened in a quantum computer environment.

An Advanced Encryption Standard (AES) is a Rijndael block cipher algorithm that was adopted in a contest hosted by the National Institute of Standards and Technology (NIST) of the United States, and in which the size of a cipher block is 128 bits and the supported encryption key lengths are 128, 192, and 256 bits. AES was standardized as Federal Information Processing Standard (FIPS) 197, AES in 2001.

Among operations (calculations) constituting the AES from the standpoint of T-depth, an operation influencing T-depth is a multiplicative inverse calculation (i.e., multiplicative inversion) in a Substitution Box (S-Box).

Attempts have been made to implement a lightweight AES in an existing computer environment, and a field towering technique for dividing an AES-related operation performed in a finite field (Galois field) $GF(2^8)$ into small finite fields and performing operations on the small finite fields is one such attempt. A field towering technique is characterized in that the sizes or the like of divided finite fields are equal to each other between different techniques, but irreducible polynomials for specifying the corresponding finite field are different from each other between the different techniques.

The field towering technique is a scheme for obtaining the results of an operation on higher finite fields using the results of operations such as multiplication and addition on the divided finite fields, and may acquire the final results (multiplicative inverse of the AES S-Box) desired to be calculated.

However, a field towering technique in an existing computer environment is disadvantageous to time and space complexity because existing inefficient finite fields are used in the calculation of a multiplicative inverse in a finite field, and also results in inefficiency because an operation (e.g., multiplication, addition or the like) in lower finite fields is performed using a single-type circuit during a quantum circuit transformation process.

Meanwhile, U.S. Pat. No. 7,421,076, entitled "Advanced encryption standard (AES) engine with real time S-box generation" discloses an AES engine with real-time S-box generation.

SUMMARY OF THE INVENTION

Accordingly, the present invention has been made keeping in mind the above problems occurring in the prior art, and an object of the present invention is to calculate a multiplicative inverse of an AES S-Box in a quantum computer environment while minimizing time and space complexity.

Another object of the present invention is to provide a field towering technique through an optimized combination of efficient finite fields and operators required to minimize time and space complexity.

In accordance with an aspect of the present invention to accomplish the above objects, there is provided an apparatus for calculating a multiplicative inverse, including a data input unit for receiving input data; a multiplicative inverse calculation unit for dividing an input degree-8 finite field corresponding to the input data into two first degree-4 finite fields so as to perform Advanced Encryption Standard (AES) encryption on the input data, and for performing a multiplicative inverse calculation on the first degree-4 finite fields in consideration of a circuit depth value (T-Depth) and qubit consumption of quantum gates in a quantum circuit; and a data output unit for outputting result data obtained by performing the multiplicative inverse calculation.

The multiplicative inverse calculation unit may include a first degree-4 multiplication unit for performing a multiplication on the first degree-4 finite fields using three degree-2 multipliers that are configured in consideration of the circuit depth value (T-depth) and the qubit consumption of the quantum gates, thus obtaining a second degree-4 finite field.

The multiplicative inverse calculation unit may further include a degree-4 multiplicative inverse calculation unit for performing a multiplication on two second degree-2 finite fields, divided from the second degree-4 finite field, using the three degree-2 multipliers, thus calculating a multiplicative inverse of the second degree-2 finite fields.

The multiplicative inverse calculation unit may further include a second degree-4 multiplication unit for performing a multiplication on any one of the first degree-4 finite fields and the multiplicative inverse of the second degree-2 finite fields using the three degree-2 multipliers, thus obtaining a third degree-4 finite field; and a third degree-4 multiplication unit for performing a multiplication on a remaining one of the first degree-4 finite fields and the multiplicative inverse of the second degree-2 finite fields using the three degree-2 multipliers, thus obtaining a fourth degree-4 finite field.

The multiplicative inverse calculation unit may further include an affine transform unit for outputting an affine-transformed output degree-8 finite field by combining the third degree-4 finite field with the fourth degree-4 finite field.

The three degree-2 multipliers may be configured such that a number, a type and an arrangement of quantum gates included in each of the degree-2 multipliers are determined based on a circuit depth value (T-depth) and qubit consumption of the quantum gates.

Each of the degree-2 multipliers may include at least one of a Toffoli gate and an AND gate.

When the circuit depth value (T-depth) of the quantum gates is less than or equal to a preset value, the corresponding degree-2 multiplier may further include at least one dagger operation AND gate.

When the degree-2 multiplier includes an AND gate and a dagger operation AND gate, the corresponding degree-2 multiplier may further include at least two AND gates or at least two dagger operation AND gates.

The three degree-2 multipliers may be configured such that at least two of the three degree-2 multipliers perform operations in parallel in consideration of the preset circuit depth value and the qubit consumption.

In accordance with another aspect of the present invention to accomplish the above objects, there is provided a method for calculating a multiplicative inverse, the method being performed by an apparatus for calculating a multiplicative inverse, the method including receiving input data; dividing an input degree-8 finite field corresponding to the input data into two first degree-4 finite fields so as to perform Advanced Encryption Standard (AES) encryption on the input data, and performing a multiplicative inverse calculation on the first degree-4 finite fields in consideration of a circuit depth value (T-Depth) and qubit consumption of quantum gates in a quantum circuit; and outputting result data obtained by performing the multiplicative inverse calculation.

Performing the multiplicative inverse calculation may be configured to perform a multiplication on the first degree-4 finite fields using three degree-2 multipliers that are configured in consideration of the circuit depth value (T-depth) and the qubit consumption of the quantum gates, thus obtaining a second degree-4 finite field.

Performing the multiplicative inverse calculation may be configured to perform a multiplication on two second degree-2 finite fields, divided from the second degree-4 finite field, using the three degree-2 multipliers, thus calculating a multiplicative inverse of the second degree-2 finite fields.

Performing the multiplicative inverse calculation may be configured to perform a multiplication on any one of the first degree-4 finite fields and the multiplicative inverse of the second degree-2 finite fields using the three degree-2 multipliers, thus obtaining a third degree-4 finite field, and perform a multiplication on a remaining one of the first degree-4 finite fields and the multiplicative inverse of the second degree-2 finite fields using the three degree-2 multipliers, thus obtaining a fourth degree-4 finite field.

The three degree-2 multipliers may be configured such that a number, a type and an arrangement of quantum gates included in each of the degree-2 multipliers are determined based on a circuit depth value (T-depth) and qubit consumption of the quantum gates.

Each of the degree-2 multipliers may include at least one of a Toffoli gate and an AND gate.

When the circuit depth value (T-depth) of the quantum gates is less than or equal to a preset value, the corresponding degree-2 multiplier may further include at least one dagger operation AND gate.

When the degree-2 multiplier includes an AND gate and a dagger operation AND gate, the corresponding degree-2 multiplier may further include at least two AND gates or at least two dagger operation AND gates.

The three degree-2 multipliers may be configured such that at least two of the three degree-2 multipliers perform operations in parallel in consideration of the preset circuit depth value and the qubit consumption.

In accordance with a further aspect of the present invention to accomplish the above objects, there is provided a circuit for calculating a multiplicative inverse, including a first degree-4 multiplier configured to perform a multiplication on two first degree-4 finite fields, which are divided from a received input degree-8 finite field so as to perform Advanced Encryption Standard (AES) encryption on input data in a quantum computer environment, using three degree-2 multipliers that are configured in consideration of a circuit depth value (T-Depth) and qubit consumption of quantum gates, thus obtaining a second degree-4 infinite field, a degree-4 multiplicative inverse calculator electrically connected to the first degree-4 multiplier and configured to perform a multiplication on two second degree-2 finite fields divided from the second degree-4 finite field using the three degree-2 multipliers, thus calculating a multiplicative inverse of the second degree-2 finite fields, a second degree-4 multiplier electrically connected to the degree-4 multiplicative inverse calculator and configured to perform a multiplication on any one of the first degree-4 finite fields and the multiplicative inverse of the second degree-2 finite fields using the three degree-2 multipliers, thus obtaining a third degree-4 finite field; and a third degree-4 multiplier electrically connected to the degree-4 multiplicative inverse calculator and configured to perform a multiplication on a remaining one of the first degree-4 finite fields and the multiplicative inverse of the second degree-2 finite fields using the three degree-2 multipliers, thus obtaining a fourth degree-4 finite field.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with the attached drawings.

Figure 1:
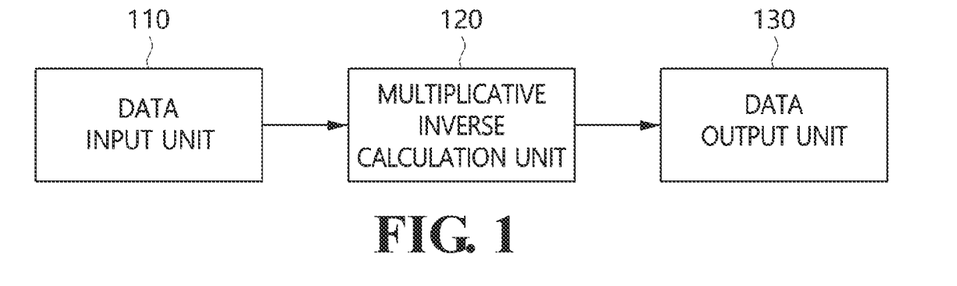
FIG. 1 is a block diagram illustrating an apparatus for calculating a multiplicative inverse according to an embodiment of the present invention.
Figure 2:
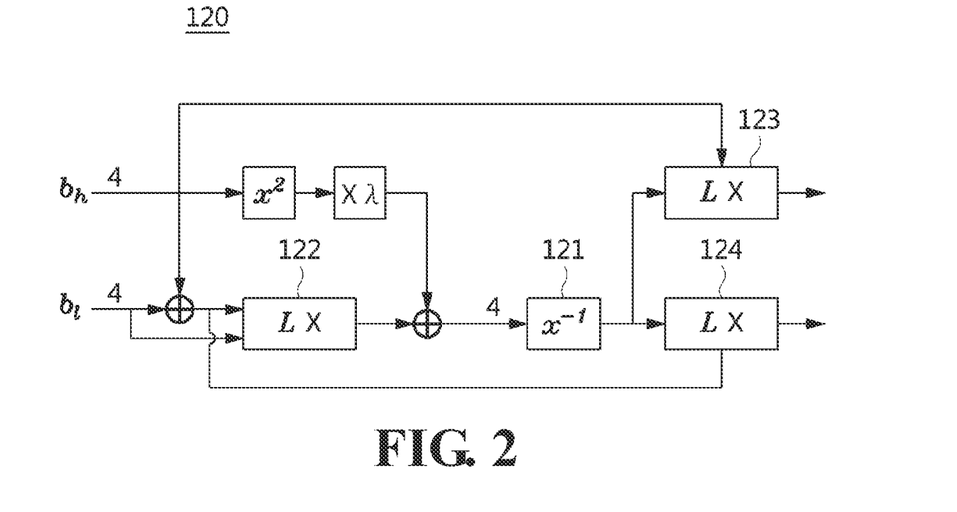
FIG. 2 is a circuit diagram illustrating in detail an example of the multiplicative inverse calculation unit illustrated in FIG. 1.
Figure 3:
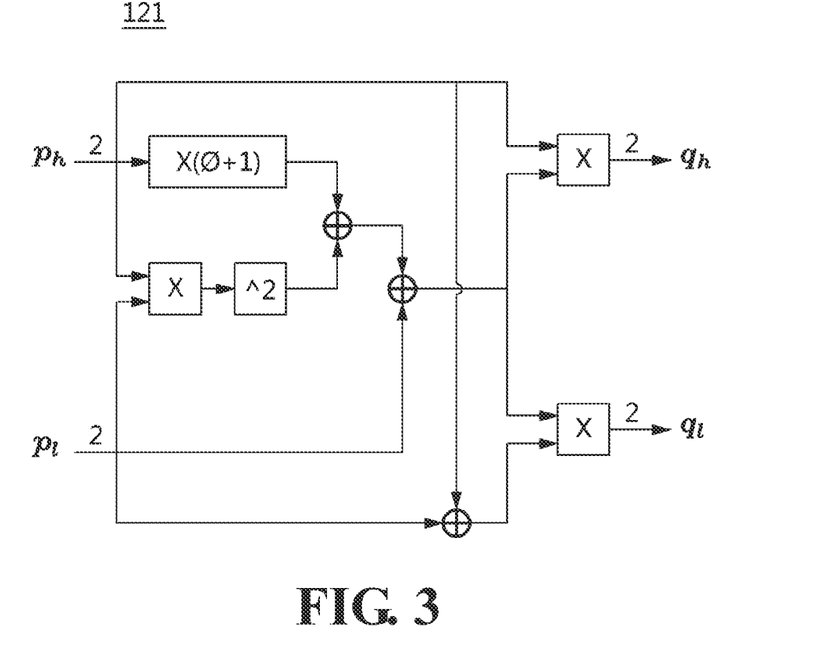
FIG. 3 is a circuit diagram illustrating an example of the degree-4 multiplication inverse calculation unit illustrated in FIG. 2.
Figure 4:
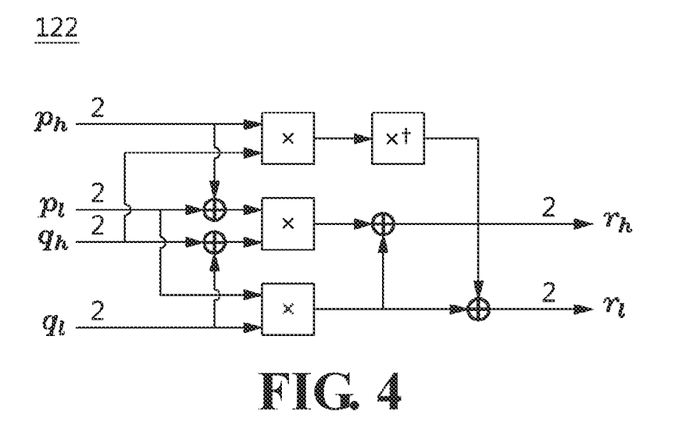
FIG. 4 is a circuit diagram illustrating in detail an example of the degree-4 multiplication unit illustrated in FIG. 2.

FIG. 1 is a block diagram illustrating an apparatus for calculating a multiplicative inverse according to an embodiment of the present invention. FIG. 2 is a circuit diagram illustrating in detail an example of the multiplicative inverse calculation unit illustrated in FIG. 1. FIG. 3 is a circuit diagram illustrating an example of the degree-4 multiplication inverse calculation unit illustrated in FIG. 2. FIG. 4 is a circuit diagram illustrating in detail an example of the degree-4 multiplication unit illustrated in FIG. 2.

The apparatus for calculating a multiplicative inverse according to the embodiment of the present invention may provide finite fields and a field towering technique for efficiently operating in a quantum computer environment.

The apparatus for calculating a multiplicative inverse according to the embodiment of the present invention may include a quantum circuit designed in consideration of a circuit depth and qubit consumption required for a multiplicative inverse calculation that is to be performed in a quantum computer environment.

The apparatus for calculating a multiplicative inverse according to the embodiment of the present invention may include various choices for time (T-depth) and space (number of qubits) complexity through a trade-off relationship between T-depth and the number of qubits during a process for performing a multiplicative inverse calculation in a quantum computer environment.

Referring to FIG. 1, the apparatus for calculating a multiplicative inverse according to the embodiment of the present invention includes a data input unit 110, a multiplicative inverse calculation unit 120, and a data output unit 130.

The data input unit 110 may receive input data required in order to perform Advanced Encryption Standard (AES) encryption.

The multiplicative inverse calculation unit 120 may divide an input degree-8 finite field (Galois Field) $GF(2^8)$ corresponding to the input data into two first degree-4 finite fields $GF(2^4)$ in order to perform AES encryption on the input data, and may perform a multiplicative inverse calculation on the first degree-4 finite fields $GF(2^4)$ in consideration of the circuit depth value (T-depth) and qubit consumption of quantum gates in a quantum circuit.

Here, the multiplicative inverse calculation unit 120 may correspond to the Substitution Box (S-Box) calculator of AES.

The data output unit 130 may output result data obtained by performing the multiplicative inverse calculation.

Referring to FIG. 2, it can be seen that a circuit diagram of a quantum circuit in which the multiplicative inverse calculation unit is implemented using a field towering technique is illustrated. That is, it can be seen that the circuit diagram illustrated in FIG. 2 shows a multiplicative inverse calculation circuit according to an embodiment of the present invention.

Here, the multiplicative inverse calculation unit may include a degree-4 multiplicative inverse calculation ($x^{-1}$) unit 121, a first degree-4 multiplication (L×) unit 122, a second degree-4 multiplication (L×) unit 123, and a third degree-4 multiplication (LX) unit 124. λ may be set differently depending on a field towering structure.

Here, finite fields used for AES encryption operations, that is, degree-8, degree-4, and degree-2 finite fields, may be represented by the following Equation (1):

$$GF(2^8), m(x) = x^8 + x^4 + x^3 + x + 1 \overset{map}{\approx} GF((2^4)^2), y^2 + y + \lambda \quad (1)$$

$$GF(2^4), m_4(x) = x^4 + x + 1 \overset{map_4}{\approx} GF((2^2)^2), z^2 + z + \phi$$

$$GF(2^2), n_2(x) = x^2 + x + 1$$

Here, $\bar{\omega}$ may be the root of $m_4(x)$, and $\phi$ may be the root of $n_2(x)$, where $\phi=\{10\}_2$. Also, λ may be represented by $\lambda := \bar{\omega}^{11} = \bar{\omega}^3 + \bar{\omega}^2 + \bar{\omega} = \{1110\}_2$.

In this case, the multiplicative inverse calculation unit 120 may perform mapping and an inverse operation of mapping between different finite fields having an isomorphic relationship therebetween in order to calculate a multiplicative inverse.

Here, the multiplicative inverse calculation unit 120 may perform mapping and an inverse operation of mapping ($map^{-1}$, $map_4^{-1}$) by applying mapping matrices (map, $map_4$) of Equation (2) to formulas corresponding to the finite fields in Equation (1).

$$map = \begin{bmatrix} 1 & 0 & 1 & 0 & 0 & 0 & 0 & 0 \\ 1 & 0 & 1 & 0 & 1 & 1 & 0 & 0 \\ 1 & 1 & 0 & 1 & 0 & 0 & 1 & 0 \\ 0 & 1 & 1 & 1 & 0 & 0 & 0 & 0 \\ 0 & 0 & 0 & 1 & 0 & 1 & 0 & 0 \\ 1 & 0 & 0 & 0 & 0 & 0 & 1 & 0 \\ 0 & 0 & 0 & 0 & 0 & 1 & 1 & 0 \\ 0 & 1 & 1 & 1 & 0 & 0 & 0 & 1 \end{bmatrix}, \quad (2)$$

$$map^{-1} = \begin{bmatrix} 1 & 0 & 1 & 1 & 0 & 1 & 0 & 0 \\ 1 & 0 & 0 & 1 & 1 & 1 & 1 & 0 \\ 0 & 0 & 1 & 1 & 0 & 1 & 0 & 0 \\ 1 & 0 & 1 & 1 & 1 & 0 & 1 & 0 \\ 0 & 1 & 1 & 1 & 0 & 0 & 1 & 0 \\ 1 & 0 & 1 & 1 & 0 & 0 & 1 & 0 \\ 1 & 0 & 1 & 1 & 0 & 0 & 0 & 0 \\ 0 & 0 & 0 & 1 & 0 & 0 & 0 & 1 \end{bmatrix}$$

$$map_4 = \begin{bmatrix} 1 & 0 & 0 & 0 \\ 1 & 1 & 1 & 0 \\ 1 & 1 & 0 & 0 \\ 0 & 0 & 0 & 1 \end{bmatrix},$$

-continued $$\text{map}_4^{-1} = \begin{bmatrix} 1 & 0 & 0 & 0 \\ 1 & 0 & 1 & 0 \\ 0 & 1 & 1 & 0 \\ 0 & 0 & 0 & 1 \end{bmatrix}$$

Here, the multiplicative inverse calculation unit 120 may output the output data corresponding to the input data in accordance with the multiplicative inversion calculator of a Substitution Box (S-Box) in AES encryption.

The multiplicative inverse calculation (multiplicative inversion) unit 120 may include a first degree-4 multiplication unit 122 for performing multiplication on the first degree-4 finite fields using three degree-2 multipliers that are configured in consideration of the circuit depth value (T-depth) and qubit consumption of quantum gates, thus obtaining a second degree-4 finite field.

The multiplicative inverse calculation unit 120 may further include a degree-4 multiplicative inverse calculation unit 121 which is electrically connected to the first degree-4 multiplication unit 122 and performs multiplication on two second degree-2 finite fields, divided from the second degree-4 finite field, using the three degree-2 multipliers, thus calculating the multiplicative inverse of the second degree-2 finite fields.

The multiplicative inverse calculation unit 120 may further include a second degree-4 multiplication unit 123 which is electrically connected to the degree-4 multiplicative inverse calculation unit 121 and performs multiplication on any one of the first degree-4 finite fields and the multiplicative inverse of the second degree-2 finite fields using the three degree-2 multipliers, thus obtaining a third degree-4 finite field.

Here, the multiplicative inverse calculation unit 120 may further include a third degree-4 multiplication unit 124, which is electrically connected to the degree-4 multiplicative inverse calculation unit 121 and performs multiplication on the remaining one of the first degree-4 finite fields and the multiplicative inverse of the second degree-2 finite fields using the three degree-2 multipliers, thus obtaining a fourth degree-4 finite field.

Here, the multiplicative inverse calculation unit 120 may further include a finite field division unit for dividing the input degree-8 finite field $GF(2^8)$ into two degree-4 finite fields $GF(2^4)$, and an affine transform unit for combining the third degree-4 finite field and the fourth degree-4 finite field, which are the output two degree-4 finite fields $GF(2^4)$, and for outputting an affine-transformed output degree-8 finite field $GF(2^8)$.

Referring to FIG. 3, it can be seen that an example of the degree-4 multiplicative inverse calculation unit 121 is depicted in a detailed circuit diagram.

Here, the relationship between the input and the output of a multiplicative inverse in a degree-4 finite field $GF(2^4)$ may be represented by the following Equation (3):

$$d^{-1} = p_h(\phi+1) + p_l + p_h^2 p_l^2$$

$$q_h = p_h d^{-1}, q_l = (p_h + p_l) d^{-1} \quad (3)$$

Here, it can be seen that $p_h$, $p_l$, $q_h$ and $q_l$ respectively correspond to degree-2 finite fields corresponding to 2 bits, and that blocks marked with "x" denote degree-2 multipliers which perform multiplication on degree-2 finite fields $GF(2^2)$.

The degree-4 multiplicative inverse calculation unit 121 may include three degree-2 multipliers, and Ψ in the circuit diagram may differ depending on the field towering structure.

The degree-4 multiplicative inverse calculation unit 121 may perform multiplications on the two second degree-2 finite fields $GF(2^2)$ ($p_h$, $p_l$) divided from the second degree-4 finite field using the three degree-2 multipliers thus calculating the multiplicative inverse ($q_h$, $q_l$) of the second degree-2 finite fields.

Referring to FIG. 4, an example of each degree-4 multiplication unit is depicted in a detailed circuit diagram.

Here, the first degree-4 multiplication unit 122, the second degree-4 multiplication unit 123, and the third degree-4 multiplication unit 124 may have the same circuit diagram structure, as illustrated in FIG. 4.

It can be seen that each block marked with "x" denotes a degree-2 multiplier which performs multiplication on degree-2 finite fields $GF(2^2)$.

It can be seen that a block marked with "$x^\dagger$" denotes a degree-2 multiplication dagger operator which performs a dagger operation on the result of performing the multiplication on the degree-2 finite fields $GF(2^2)$.

A dagger operation may be an operation of restoring a state before the operation is performed so as to reuse qubits or the like.

Here, "†" indicating a dagger operation may correspond to a Hermitian operator.

Here, the three degree-2 multipliers may cause a circuit depth (T-depth) during multiplication on the degree-2 finite fields $GF(2^2)$, and at least two of the three degree-2 multipliers may perform operations in parallel.

A circuit for calculating the multiplication inverse of the degree-2 finite fields $GF(2^2)$ may be implemented in various forms because there is a trade-off relationship between time (T-depth) complexity and space (qubit consumption) complexity in a quantum computer environment.

FIGS. 5 to 9 are circuit diagrams illustrating gate configurations according to an embodiment of the present invention.

Here, in the three degree-2 multipliers, the number, type, and arrangement of quantum gates included in each degree-2 multiplier may be determined based on the circuit depth value (T-depth) and qubit consumption of the quantum gates.

Here, each degree-2 multiplier may include at least one of a Toffoli gate and an AND gate.

Figure 5:
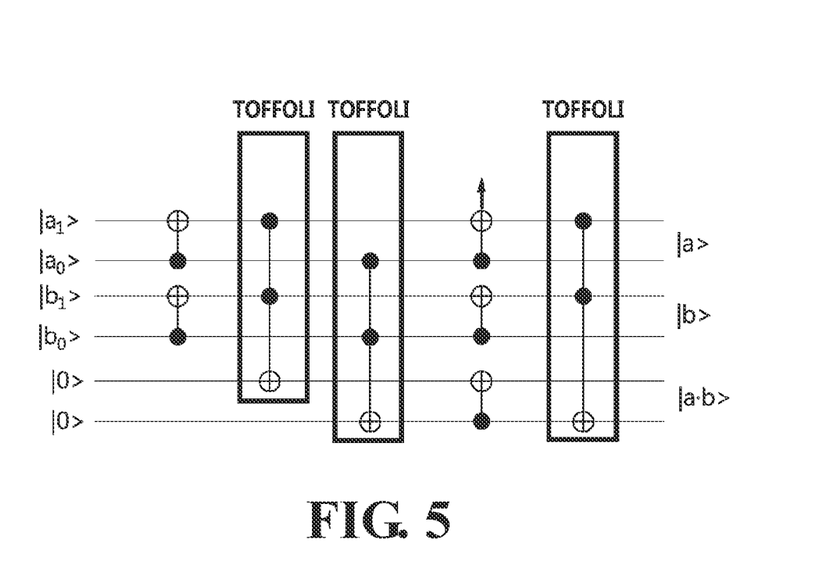
FIGS. 5 to 9 are circuit diagrams illustrating gate configurations according to an embodiment of the present invention.

Referring to FIG. 5, a circuit diagram of a $x_{T3}$ degree-2 multiplier is illustrated.

The $x_{T3}$ degree-2 multiplier may include three Toffoli gates.

In this case, the $x_{T3}$ degree-2 multiplier may correspond to a T-depth of 9 and a qubit consumption of 6.

Figure 6:
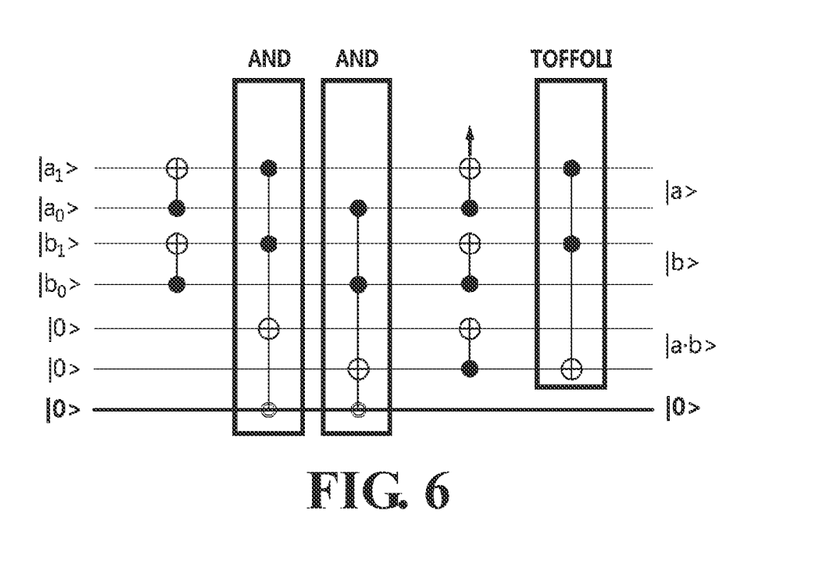

Referring to FIG. 6, a circuit diagram of a $x_{A2}$ degree-2 multiplier is illustrated.

The $x_{A2}$ degree-2 multiplier may include two AND gates and one Toffoli gate.

Here, the $x_{A2}$ degree-2 multiplier may correspond to a T-depth of 5 and a qubit consumption of 7.

Further, when the circuit depth value (T-depth) of the quantum gate is less than or equal to a preset value, the degree-2 multiplier may include at least one dagger operation AND gate (AND$^\dagger$ gate).

Here, when the degree-2 multiplier includes at least one dagger operation AND gate (AND$^\dagger$ gate), it may be represented by a $x^\dagger$ degree-2 multiplication dagger operator.

A dagger operation may be performed as an operation of restoring a state before an operation is performed so as to reuse qubits or the like.

Here, "†", indicating a dagger operation, may correspond to a Hermitian operator.

Further, when the degree-2 multiplier includes an AND gate and a dagger operation AND gate, it may further include at least two AND gates or at least two dagger operation AND gates.

Figure 7:
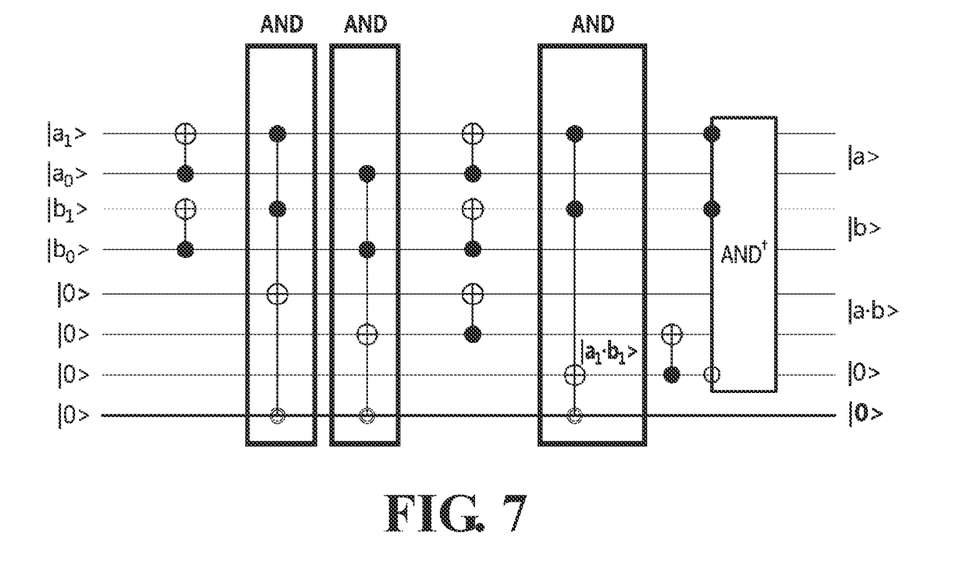

Referring to FIG. 7, a circuit diagram of a $x_{A3}$ degree-2 multiplier is illustrated.

The $x_{A3}$ degree-2 multiplier may include three AND gates and one dagger operation AND gate (AND$^\dagger$ gate).

Here, the $x_{A3}$ degree-2 multiplier may correspond to a T-depth of 3 and a qubit consumption of 8.

Figure 8:
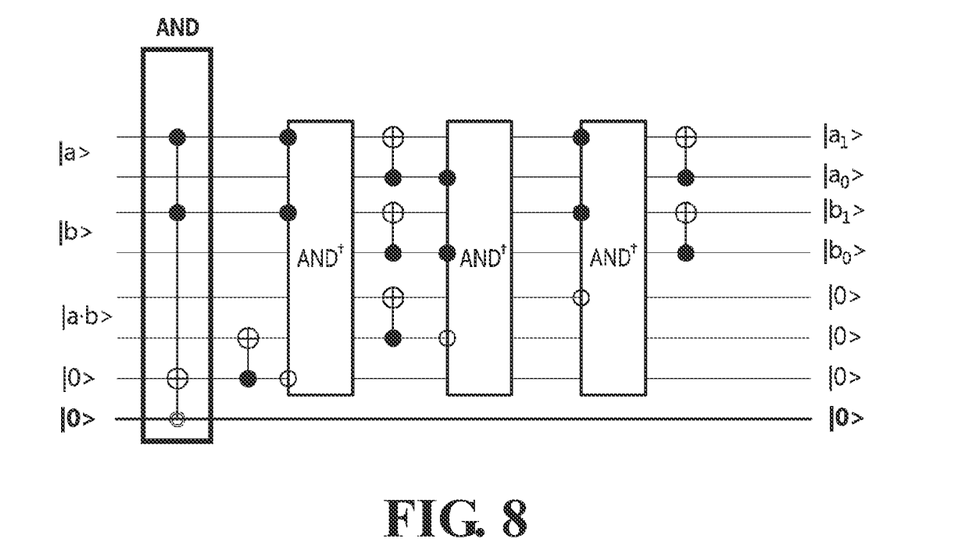

Referring to FIG. 8, a circuit diagram of a $x_{A3}^\dagger$ degree-2 multiplication dagger operator is illustrated.

The $x_{A3}^\dagger$ degree-2 multiplication dagger operator may include one AND gate and three dagger operation AND gates (AND$^\dagger$ gates).

Here, the $x_{A3}^\dagger$ degree-2 multiplication dagger operator may correspond to a T-depth of 1 and a qubit consumption of 8.

Figure 9:
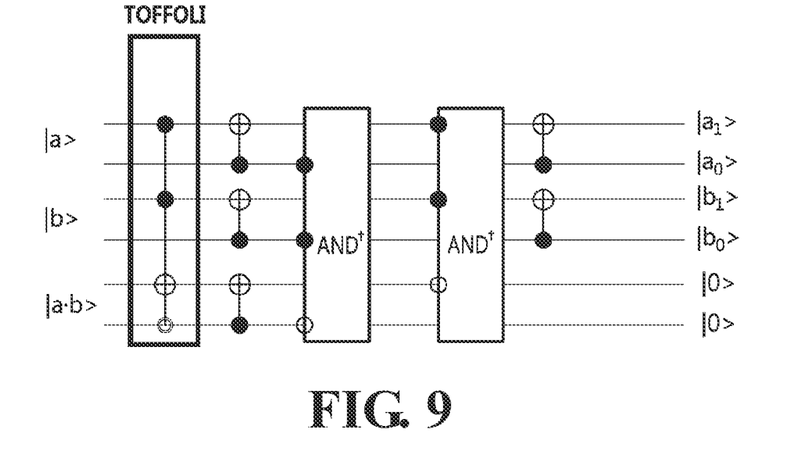

Referring to FIG. 9, a circuit diagram of a $x_{A2}^\dagger$ degree-2 multiplication dagger operator is illustrated.

The $x_{A2}^\dagger$ degree-2 multiplication dagger operator may include one Toffoli gate and two dagger operation AND gates (AND$^\dagger$ gates).

Here, the $x_{A2}^\dagger$ degree-2 multiplication dagger operator may correspond to a T-depth of 3 and a qubit consumption of 6.

In FIGS. 5 to 9, the mark ⊚ indicates spare qubits for the AND operation of an AND gate.

FIGS. 10 to 13 are circuit diagrams illustrating the arrangement of three degree-2 multipliers and a degree-2 multiplication dagger operator which are illustrated in FIG. 4.

The three degree-2 multipliers and the degree-2 multiplication dagger operator may be arranged in a circuit in consideration of a preset circuit depth value and qubit consumption.

Here, at least two of the three degree-2 multipliers may perform operations in parallel.

The implementation of quantum circuits for the degree-4 multiplication units 122, 123, and 124 which perform multiplications on a degree-4 finite field GF($2^4$) in a quantum computer environment may have different circuit depth values (T-depth) and qubit consumptions depending on a scheme for arranging three degree-2 multipliers, which perform multiplications on degree-2 finite fields GF($2^2$), in parallel or in series and additionally depending on which type of quantum circuit corresponding to each operation is to be used.

Here, the quantum circuits for the degree-4 multiplication units 122, 123, and 124 according to an embodiment of the present invention may receive, as input, $p_h$, $p_l$, $q_h$ and $q_l$, and may provide, as output, $p_h$, $p_l$, $q_h$ and $q_l$ and $r_h$ and $r_l$ (upper 2 bits and lower 2 bits of respective multiplication results).

Each degree-4 multiplication unit may restore an intermediate value other than intended output to a state |0> in a calculation process, and may additionally perform a dagger ($x_{A3}^\dagger$) operation so as to perform multiplication on degree-2 finite fields GF($2^2$).

Here, it can be seen that, in each degree-4 multiplication unit, the influence of the remaining operators other than degree-2 multipliers, which perform multiplication on degree-2 finite fields GF($2^2$), and the degree-2 multiplication dagger operator, which performs a dagger operation, on T-depth and qubit consumption is insignificant, and thus representation of the remaining operators in a circuit diagram is omitted.

Figure 10:
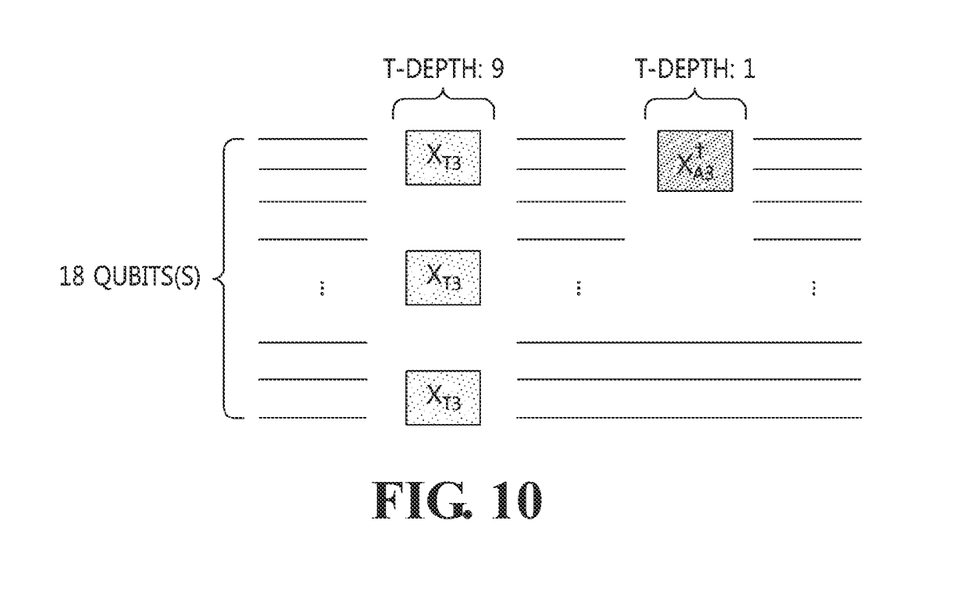
FIGS. 10 to 13 are circuit diagrams illustrating the arrangement of degree-2 multipliers illustrated in FIG. 4.

Referring to FIG. 10, in the degree-4 multiplication unit illustrated in FIG. 4, three $x_{T3}$ degree-2 multipliers may perform operations in parallel, and a $x_{A3}^\dagger$ degree-2 multiplication dagger operator may perform an operation in series to the operations of the three $x_{T3}$ degree-2 multipliers.

Here, it can be seen that the total qubit consumption is 18, the T-depth of the $x_{T3}$ degree-2 multipliers is 9, and the T-depth of the $x_{A3}^\dagger$ degree-2 multiplication dagger operator is 1.

Figure 11:
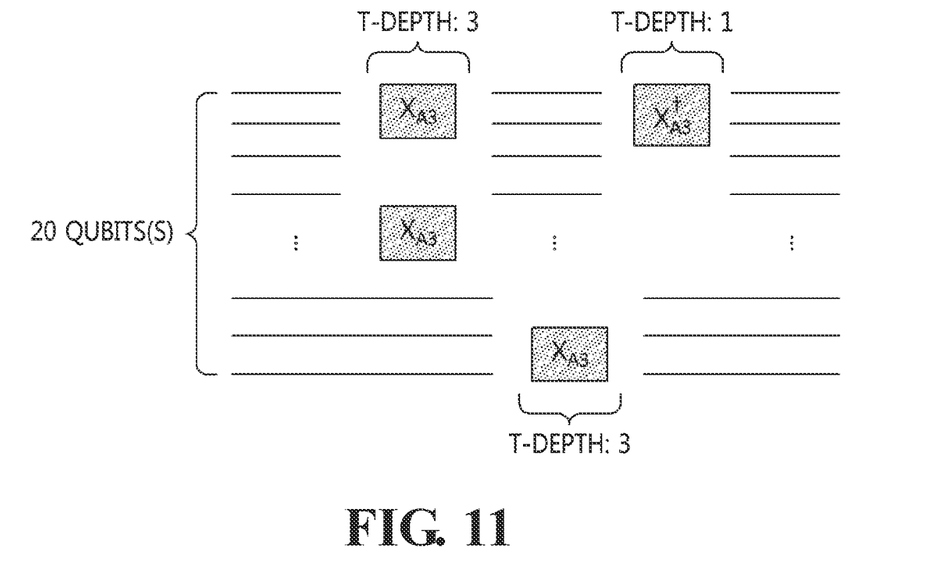

Referring to FIG. 11, in the degree-4 multiplication unit illustrated in FIG. 4, two $x_{A3}$ degree-2 multipliers may perform operations in parallel, after which one $x_{A3}$ degree-2 multiplier performs an operation and a $x_{A3}^\dagger$ degree-2 multiplication dagger operator performs an operation in series to the operations of the $x_{A3}$ degree-2 multipliers.

Here, it can be seen that the total qubit consumption is 20, the T-depth of the two $x_{A3}$ degree-2 multipliers which perform operations in parallel is 3, the T-depth of one $x_{A3}$ degree-2 multiplier is 3, and the T-depth of the $x_{A3}^\dagger$ degree-2 multiplication dagger operator is 1.

Figure 12:
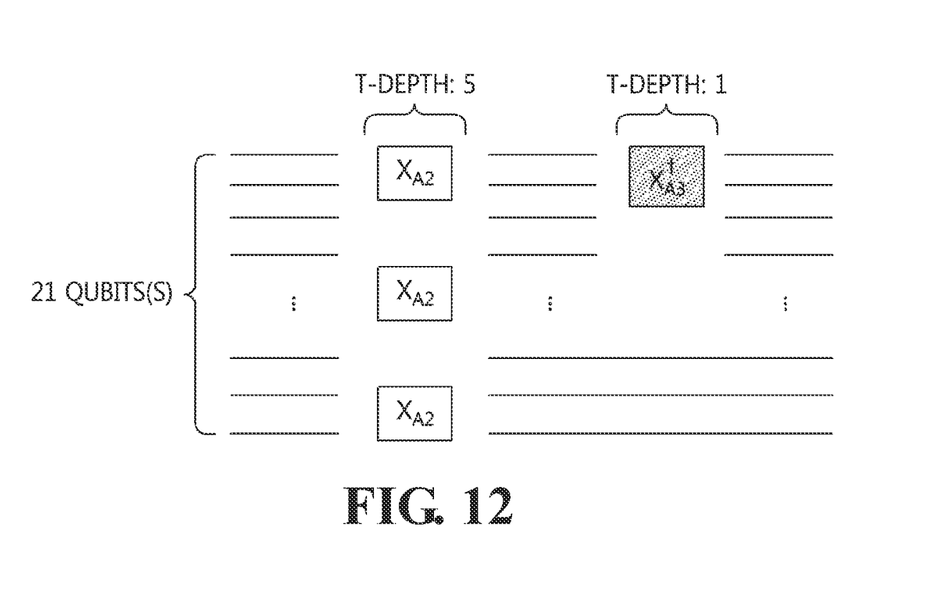

Referring to FIG. 12, in the degree-4 multiplication unit illustrated in FIG. 4, three $x_{A2}$ degree-2 multipliers may perform operations in parallel, and a $x_{A3}^\dagger$ degree-2 multiplication dagger operator may perform an operation in series to the three $x_{A2}$ degree-2 multipliers.

In this case, it can be seen that the total qubit consumption is 21, the T-depth of $x_{A2}$ degree-2 multipliers is 5, and the T-depth of the $x_{A3}^\dagger$ degree-2 multiplication dagger operator is 1.

Figure 13:
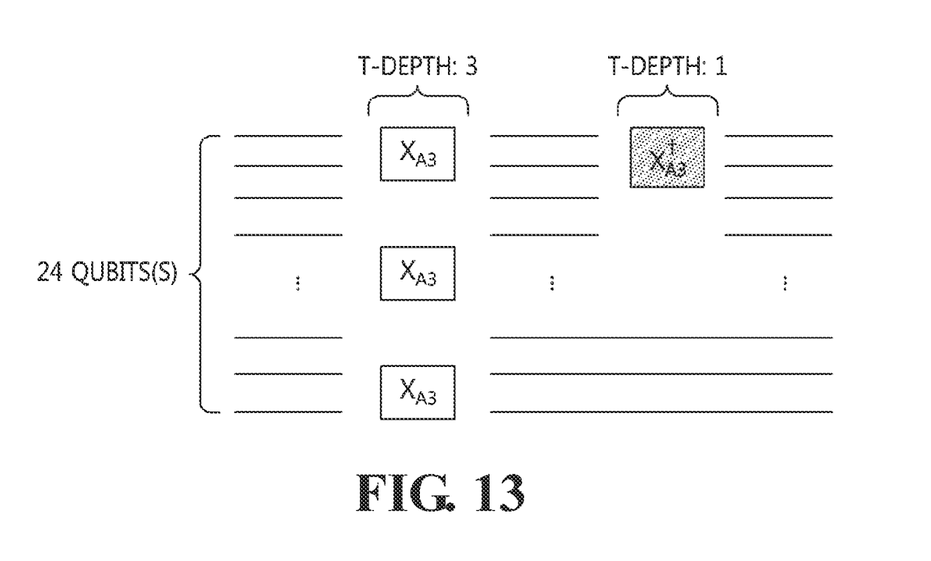

Referring to FIG. 13, in the degree-4 multiplication unit illustrated in FIG. 4, three $x_{A3}$ degree-2 multipliers may perform operations in parallel, and a $x_{A3}^\dagger$ degree-2 multiplication dagger operator may perform an operation in series to the $x_{A3}$ degree-2 multipliers.

Here, it can be seen that the total qubit consumption is 24, the T-depth of the $x_{A3}$ degree-2 multipliers is 3, and the T-depth of the $x_{A3}^\dagger$ degree-2 multiplication dagger 1o operator is 1.

Figure 14:
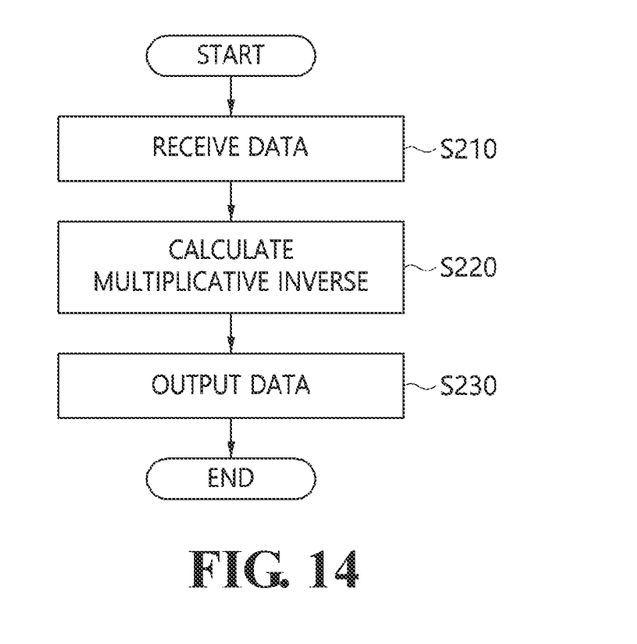
FIG. 14 is an operation flowchart illustrating a method for calculating a multiplicative inverse according to an embodiment of the present invention.

FIG. 14 is an operation flowchart illustrating a method for calculating a multiplicative inverse according to an embodiment of the present invention.

Referring to FIG. 14, the multiplicative inverse calculation method according to the embodiment of the present invention may receive data at step S210.

That is, at step S210, input data may be received.

Also, the multiplicative inverse calculation method according to the embodiment of the present invention may perform a multiplicative inverse calculation at step S220.

That is, at step S220, an input degree-8 finite field corresponding to the input data may be divided into two first degree-4 finite fields so as to perform Advanced Encryption Standard (AES) encryption on the input data, and the multiplicative inverse calculation may be performed on the first degree-4 finite fields in consideration of the circuit depth value (T-Depth) and qubit consumption of quantum gates in quantum circuits.

At step S220, multiplication may be performed on the first degree-4 finite fields using three degree-2 multipliers that are configured in consideration of the circuit depth value (T-depth) and qubit consumption of the quantum gates, thus obtaining a second degree-4 finite field.

Here, at step S220, multiplication may be performed on two second degree-2 finite fields, divided from the second degree-4 finite field, using the three degree-2 multipliers, and thus multiplicative inverse of the second degree-2 finite fields may be calculated.

In this case, at step S220, multiplication may be performed on any one of the first degree-4 finite fields and the multiplicative inverse of the second degree-2 finite fields using the three degree-2 multipliers, thus obtaining a third degree-4 finite field.

Here, at step S220, multiplication may be performed on the remaining one of the first degree-4 finite fields and the multiplicative inverse of the second degree-2 finite fields using the three degree-2 multipliers, thus obtaining a fourth degree-4 finite field.

Here, at step S220, an affine-transformed output degree-8 finite field may be output by combining the third degree-4 finite field with the fourth degree-4 finite field.

The number, type, and arrangement of quantum gates included in each of the three degree-2 multipliers may be determined based on the circuit depth value (T-depth) and qubit consumption of the quantum gates.

Here, each degree-2 multiplier may include at least one of a Toffoli gate and an AND gate.

When the circuit depth value (T-depth) of each quantum gate is less than or equal to a preset value, the degree-2 multiplier may include at least one dagger operation AND gate.

Here, when each degree-2 multiplier includes an AND gate and a dagger operation AND gate, it may further include at least two AND gates or at least two dagger operation AND gates.

Here, among the three degree-2 multipliers, at least two degree-2 multipliers may perform operations in parallel in consideration of the preset circuit depth value and the qubit consumption.

Further, the multiplicative inverse calculation method according to the embodiment of the present invention may output data at step S230.

That is, at step S230, an output degree-8 finite field, which is result data obtained by performing the multiplicative inverse calculation, may be output.

Figure 15:
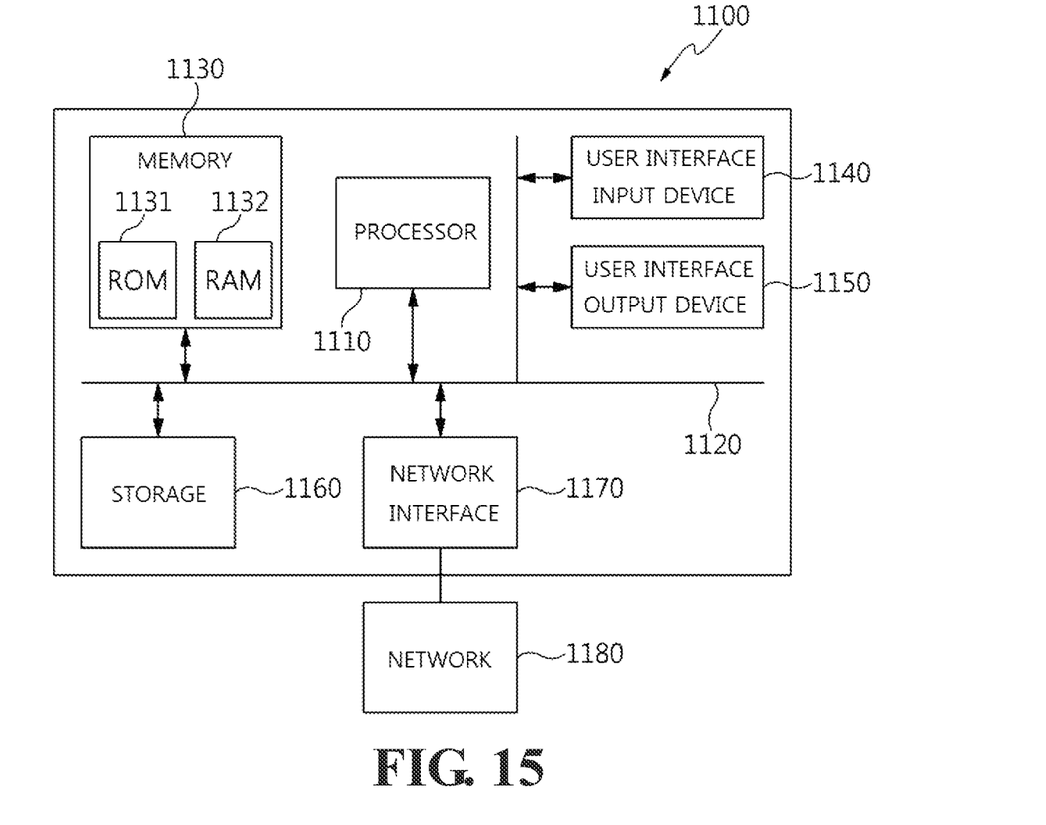
FIG. 15 is a diagram illustrating a computer system according to an embodiment of the present invention.

FIG. 15 is a diagram illustrating a computer system according to an embodiment of the present invention.

Referring to FIG. 15, apparatus for calculating multiplicative inverse according to an embodiment of the present invention may be implemented in a computer system 1100, such as a computer-readable storage medium. As illustrated in FIG. 13, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Therefore, the apparatus and method for calculating a multiplicative inverse according to embodiments of the present invention may adjust time (T-depth) complexity and space (qubit) complexity of the multiplicative inverse calculation (multiplicative inversion) which occupies the greatest proportion of costs (based on T-depth) in an AES S-Box quantum circuit, by means of a trade-off between time complexity and space complexity.

That is, the apparatus and method for calculating a multiplicative inverse according to embodiments of the present invention may provide a quantum circuit configuration that is capable of selecting T-depth and qubit consumption through a trade-off relationship therebetween depending on the circumstances, unlike existing quantum circuits, and may greatly decrease T-depth or qubit consumption through a slight increase in the consumption of other resources depending on the selection.

The present invention may calculate a multiplicative inverse of an AES S-Box in a quantum computer environment while minimizing time and space complexity.

The present invention may provide a field towering technique through an optimized combination of efficient finite fields and operators required to minimize time and space complexity.

As described above, in the apparatus and method for calculating a multiplicative inverse according to the present invention, the configurations and schemes in the above-described embodiments are not limitedly applied, and some or all of the above embodiments can be selectively combined and configured such that various modifications are possible.

What is claimed is:
1. An apparatus for calculating a multiplicative inverse, comprising:
one or more processors; and
executable memory for storing at least one program executed by the one or more processors,
wherein the at least one program is configured to:
receive input data;
divide an input degree-8 finite field corresponding to the input data into two first degree-4 finite fields so as to perform Advanced Encryption Standard (AES) encryption on the input data, and for performing a multiplicative inverse calculation on the first degree-4 finite fields in consideration of a circuit depth value (T-Depth) and qubit consumption of quantum gates in a quantum circuit; and
output result data obtained by performing the multiplicative inverse calculation,
wherein the at least one program is configured to perform a multiplication on the first degree-4 finite fields using three degree-2 multipliers that are configured in consideration of the circuit depth value (T-depth) and the qubit consumption of the quantum gates, thus obtaining a second degree-4 finite field,
wherein the three degree-2 multipliers are configured such that a number, a type and an arrangement of quantum gates included in each of the degree-2 multipliers are determined based on a circuit depth value (T-depth) and qubit consumption of the quantum gates,
wherein each of degree-2 multipliers comprises:
a plurality of interconnected logic gates, configured to perform multiplication operations to produce the corresponding polynomial product.
2. The apparatus of claim 1, wherein the at least one program is configured to perform a multiplication on two second degree-2 finite fields, divided from the second degree-4 finite field, using the three degree-2 multipliers, thus calculating a multiplicative inverse of the second degree-2 finite fields.
3. The apparatus of claim 2, wherein the at least one program is configured to:

perform a multiplication on any one of the first degree-4 finite fields and the multiplicative inverse of the second degree-2 finite fields using the three degree-4 multipliers, thus obtaining a third degree-4 finite field; and perform a multiplication on a remaining one of the first degree-4 finite fields and the multiplicative inverse of the second degree-2 finite fields using the three degree-2 multipliers, thus obtaining a fourth degree-4 finite field.

4. The apparatus of claim 3, wherein the at least one program is configured to output an affine-transformed output degree-8 finite field by combining the third degree-4 finite field with the fourth degree-4 finite field.

5. The apparatus of claim 1, wherein each of the degree-2 multipliers comprises at least one of a Toffoli gate and an AND gate.

6. The apparatus of claim 5, wherein, when the circuit depth value (T-depth) of the quantum gates is less than or equal to a preset value, the corresponding degree-2 multiplier further comprises at least one dagger operation AND gate.

7. The apparatus of claim 6, wherein, when the degree-2 multiplier comprises an AND gate and a dagger operation AND gate, the corresponding degree-2 multiplier further comprises at least two AND gates or at least two dagger operation AND gates.

8. The apparatus of claim 1, wherein the three degree-2 multipliers are configured such that at least two of the three degree-2 multipliers perform operations in parallel in consideration of the preset circuit depth value and the qubit consumption.

9. A method for calculating a multiplicative inverse, the method being performed by an apparatus for calculating a multiplicative inverse, the method comprising:
receiving input data;
dividing an input degree-8 finite field corresponding to the input data into two first degree-4 finite fields so as to perform Advanced Encryption Standard (AES) encryption on the input data, and performing a multiplicative inverse calculation on the first degree-4 finite fields in consideration of a circuit depth value (T-Depth) and qubit consumption of quantum gates in a quantum circuit; and
outputting result data obtained by performing the multiplicative inverse calculation,
wherein performing the multiplicative inverse calculation is configured to perform a multiplication on the first degree-4 finite fields using three degree-2 multipliers that are configured in consideration of the circuit depth value (T-depth) and the qubit consumption of the quantum gates, thus obtaining a second degree-4 finite field,
wherein the three degree-2 multipliers are configured such that a number, a type and an arrangement of quantum gates included in each of the degree-2 multipliers are determined based on a circuit depth value (T-depth) and qubit consumption of the quantum gates,
wherein each of degree-2 multipliers comprises:
a plurality of interconnected logic gates, configured to perform multiplication operations to produce the corresponding polynomial product.

10. The method of claim 9, wherein performing the multiplicative inverse calculation is configured to perform a multiplication on two second degree-2 finite fields, divided from the second degree-4 finite field, using the three degree-2 multipliers, thus calculating a multiplicative inverse of the second degree-2 finite fields.

11. The method of claim 10, wherein performing the multiplicative inverse calculation is configured to:
perform a multiplication on any one of the first degree-4 finite fields and the multiplicative inverse of the second degree-2 finite fields using the three degree-2 multipliers, thus obtaining a third degree-4 finite field, and
perform a multiplication on a remaining one of the first degree-4 finite fields and the multiplicative inverse of the second degree-2 finite fields using the three degree-2 multipliers, thus obtaining a fourth degree-4 finite field.

12. The method of claim 9, wherein each of the degree-2 multipliers comprises at least one of a Toffoli gate and an AND gate.

13. The method of claim 12, wherein, when the circuit depth value (T-depth) of the quantum gates is less than or equal to a preset value, the corresponding degree-2 multiplier further comprises at least one dagger operation AND gate.

14. The method of claim 13, wherein, when the degree-2 multiplier comprises an AND gate and a dagger operation AND gate, the corresponding degree-2 multiplier further comprises at least two AND gates or at least two dagger operation AND gates.

15. The method of claim 9, wherein the three degree-2 multipliers are configured such that at least two of the three degree-2 multipliers perform operations in parallel in consideration of the preset circuit depth value and the qubit consumption.

16. A circuit for calculating a multiplicative inverse, comprising:
a first degree-4 polynomial multiplication circuit configured to perform a multiplication on two first degree-4 finite fields, which are divided from a received input degree-8 finite field so as to perform Advanced Encryption Standard (AES) encryption on input data in a quantum computer environment, using three degree-2 polynomial multiplication circuits that are configured in consideration of a circuit depth value (T-Depth) and qubit consumption of quantum gates, thus obtaining a second degree-4 infinite field;
a degree-4 polynomial inverse computation circuit electrically connected to the first degree-4 polynomial multiplication circuit and configured to perform a multiplication on two second degree-2 finite fields divided from the second degree-4 finite field using the three second-degree polynomial multiplication circuits, thus calculating a multiplicative inverse of the second degree-2 finite fields;
a second degree-4 polynomial multiplication circuit electrically connected to the degree-4 polynomial inverse computation circuit and configured to perform a multiplication on any one of the first degree-4 finite fields and the multiplicative inverse of the second degree-2 finite fields using the three degree-2 polynomial multiplication circuits, thus obtaining a third degree-4 finite field; and
a third degree-4 polynomial multiplication circuit electrically connected to the degree-4 polynomial inverse computation circuit and configured to perform a multiplication on a remaining one of the first degree-4 finite fields and the multiplicative inverse of the second degree-2 finite fields using the three degree-2 polynomial multiplication circuits, thus obtaining a fourth degree-4 finite field,
wherein the three degree-2 polynomial multiplication circuits are configured such that a number, a type and an arrangement of quantum gates included in each of the degree-2 polynomial multiplication circuits are determined based on a circuit depth value (T-depth) and qubit consumption of the quantum gates wherein each of the degree-4 polynomial multiplication circuits, each of the degree-2 polynomial multiplication circuits and the degree-4 polynomial inverse computation circuit comprises:

a plurality of interconnected logic gates, configured to perform multiplication operations to produce the corresponding polynomial product.

* * * * *